(12) United States Patent
Luo et al.

(10) Patent No.: US 11,095,132 B2
(45) Date of Patent: Aug. 17, 2021

(54) BATTERY MANAGEMENT SYSTEM

(71) Applicant: Contemporary Amperex Technology Co., Limited, Ningde (CN)

(72) Inventors: Huixiu Luo, Ningde (CN); Baohai Du, Ningde (CN); Wei Zhang, Ningde (CN); Qiandeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 189 days.

(21) Appl. No.: 16/588,775

(22) Filed: Sep. 30, 2019

(65) Prior Publication Data

US 2020/0274369 A1  Aug. 27, 2020

(30) Foreign Application Priority Data

Feb. 25, 2019  (CN) .......................... 201910136059.6

(51) Int. Cl.
*H02J 7/00* (2006.01)
*B60L 58/10* (2019.01)
(Continued)

(52) U.S. Cl.
CPC ............ *H02J 7/0021* (2013.01); *B60L 58/10* (2019.02); *H01M 10/4207* (2013.01); *H01M 10/441* (2013.01)

(58) Field of Classification Search
USPC .......................................................... 320/106
See application file for complete search history.

(56) References Cited

U.S. PATENT DOCUMENTS 8,264,201 B2 * 9/2012 Tae ....................... H02J 7/0026
320/118
2014/0212714 A1 7/2014 Butzmann
(Continued)

FOREIGN PATENT DOCUMENTS

CN 101442211 A 5/2009
CN 103779943 A 5/2014
(Continued)

OTHER PUBLICATIONS

Chinese Second Office Action dated Aug. 25, 2020, Patent Application No. 201910136059.6, 7 pages.
(Continued)

*Primary Examiner* — Mohammed Alam
(74) *Attorney, Agent, or Firm* — Davis Wright Tremaine LLP

(57) ABSTRACT

Embodiments of the present disclosure disclose a battery management system. In the system, a first microcontroller is connected to a second microcontroller; a battery monitoring module is configured to monitor a state of the battery pack and transmit the state of the battery pack to the first and the second microcontroller respectively via a state signal of the battery pack, and control the state of the battery pack according to a control instruction from the first and the second microcontroller; a sampling control module is configured to detect the state of a high voltage loop of the battery pack, and transmit the state of the high voltage loop to the first and the second microcontroller respectively via a state signal of the high voltage loop of the battery pack, and control the state of the high voltage loop according to a control instruction from the first and the second microcontroller.

20 Claims, 6 Drawing Sheets

(51) Int. Cl.
H01M 10/42 (2006.01)
H01M 10/44 (2006.01)

(56) References Cited

U.S. PATENT DOCUMENTS

| | | | | |
|---|---|---|---|---|
| 2014/0320143 | A1* | 10/2014 | Butzmann | G01R 31/3842 |
| | | | | 324/427 |
| 2017/0187218 | A1* | 6/2017 | Thomsen | H02J 7/00 |
| 2018/0069418 | A1* | 3/2018 | Tian | H02M 7/04 |
| 2019/0222038 | A1* | 7/2019 | Chen | H01M 10/63 |
| 2020/0274369 | A1* | 8/2020 | Luo | B60L 58/10 |
| 2020/0412164 | A1* | 12/2020 | Miller | H02J 7/0068 |
| 2021/0028632 | A1* | 1/2021 | Hofer | H02J 7/0013 |

FOREIGN PATENT DOCUMENTS

| | | |
|---|---|---|
| CN | 104104118 A | 10/2014 |
| CN | 104852420 A | 8/2015 |
| CN | 206541901 U | 10/2017 |
| CN | 105730274 B | 12/2017 |
| CN | 107732985 A | 2/2018 |
| CN | 107871909 A | 4/2018 |
| CN | 107933337 A | 4/2018 |
| CN | 109888864 A | 6/2019 |
| JP | 2013105701 A | 5/2013 |

OTHER PUBLICATIONS

Chinese Third Office Action dated Nov. 25, 2020, Patent Application No. 201910136059.6, 8 pages.
Dong et al., "Design of power battery and management system for pure electric vehicle," Apr. 30, 2017, 5 pages.
Extended European Search Report dated Mar. 4, 2021, Patent Application No. 19201016.3, 18 pages.
International Search Report and Written Opinion dated May 29, 2020, Patent Application No. PCT/CN2020/076557, 7 pages.
Chinese First Office Action dated Jun. 3, 2020, Patent Application No. 201910136059.6, 18 pages.

* cited by examiner

BATTERY MANAGEMENT SYSTEM

CROSS-REFERENCE TO RELATED APPLICATIONS

This application claims the priority benefit of Chinese Patent Application No. 201910136059.6 filed on Feb. 25, 2019, the entire content of which is incorporated herein by reference.

TECHNICAL FIELD

Embodiments of the present disclosure generally relate to the field of new energy vehicles, and more particularly, to a battery management system.

BACKGROUND

Recently, new energy vehicles have been included in a major strategy of energy conservation and emission reduction. With an inclination of various preferential policies for new energy vehicles, more and more enterprises have joined in the field of new energy vehicles. However, there are still many challenges in the field of new energy vehicles, such as a lack of competitiveness of core technologies, inadequate infrastructure equipment, inconsistent technical standards, and low entry barriers. As an electric vehicle being an important means of transportation, safety of the electric vehicle is the most concerned and valued issue for consumers and vehicle companies, among which power safety of electric vehicles is an urgent problem to be solved by various vehicle companies, especially the safety of batteries that power electric vehicles.

SUMMARY

Some embodiments of the present disclosure provide a battery management system. The battery management system includes: a battery monitoring module, a first microcontroller, a second microcontroller, and a sampling control module. The first microcontroller is connected to the second microcontroller. The battery monitoring module is configured to monitor a state of a battery pack, and transmit the state of the battery pack to the first microcontroller and the second microcontroller respectively via a state signal of the battery pack, and control the state of the battery pack according to a first control instruction from the first microcontroller and the second microcontroller. The sampling control module is configured to detect a state of a high voltage loop of the battery pack, and transmit the state of the high voltage loop of the battery pack to the first microcontroller and the second microcontroller respectively via a state signal of the high voltage loop of the battery pack, and control the state of the high voltage loop of the battery pack according to a second control instruction from the first microcontroller and the second microcontroller. When the first microcontroller and the second microcontroller are in normal operation, the first microcontroller and the second microcontroller individually acquire the state signal of the battery pack and the state signal of the high voltage loop of the battery pack, and each of the first microcontroller and the second microcontroller independently perform a control on the battery pack and the battery management system via the battery monitoring module according to the state signal of the battery pack and via the sampling control module according to the state signal of the high voltage loop of the battery pack, or, the first microcontroller independently performs the control on the battery pack and the battery management system via the battery monitoring module according to the state signal of the battery pack and via the sampling control module according to the state signal of the high voltage loop of the battery pack, and the second microcontroller is in a standby state.

In one example, if each of the first microcontroller and the second microcontroller independently perform the control on the battery pack and the battery management system via the battery monitoring module according to the state signal of the battery pack and via the sampling control module according to the state signal of the high voltage loop of the battery pack, the effective microcontroller independently performs the control on the battery pack when either of the first microcontroller and the second microcontroller is out of operation.

In one example, if the first microcontroller independently performs the control on the battery pack and the battery management system via the battery monitoring module according to the state signal of the battery pack and via the sampling control module according to the state signal of the high voltage loop of the battery pack, and the second microcontroller is in a standby state, the second microcontroller independently performs the control on the battery pack and the battery management system via the battery monitoring module according to the state signal of the battery pack and via the sampling control module according to the state signal of the high voltage loop of the battery pack when the second microcontroller detects that the first microcontroller is out of operation.

In one example, the sampling control module includes a high voltage measurement unit, a first high voltage control unit and a second high voltage control unit; the high voltage measurement unit is configured to obtain the state signal of the high voltage loop of the battery pack by sampling, and transmit the state signal of the high voltage loop of the battery pack to the first microcontroller and the second microcontroller; the first high voltage control unit is configured to control a state of a first switching unit in the high voltage loop of the battery pack according to the second control instruction from the first microcontroller and/or the second microcontroller; the second high voltage control unit is configured to control a state of a second switching unit in the high voltage loop of the battery pack according to the second control instruction from the first microcontroller and/or the second microcontroller.

In one example, the battery management system further includes one or both of a first transmission module and a second transmission module. The battery monitoring module transmits the state signal of the battery pack to the first microcontroller and the second microcontroller via the first transmission module. The second transmission module is configured to transmit the state signal of the high voltage loop of the battery pack sampled by the high voltage measurement unit to the first microcontroller and the second microcontroller; and/or the second transmission module is configured to transmit the second control instruction of the first microcontroller to the first high voltage control unit and/or the second high voltage control unit, and transmit the second control instruction from the second microcontroller to the first high voltage control unit and/or the second high voltage control unit.

In one example, the high voltage measurement unit includes a first high voltage measurement subunit and a second high voltage measurement subunit; the first high voltage measurement subunit is configured to obtain the state signal of the high voltage loop of the battery pack by sampling, and transmit the state signal of the high voltage loop of the battery pack to the first microcontroller via the second transmission module; the second high voltage measurement subunit is configured to obtain the state signal of the high voltage loop of the battery pack by sampling, and transmit the state signal of the battery pack high voltage loop to the second microcontroller via the second transmission module.

In one example, the second transmission module includes a first separation unit and a second separation unit; the first separation unit is configured to convert the state signal of the high voltage loop of the battery pack sampled by the first high voltage measurement subunit from a high voltage signal to a low voltage signal and transmit the converted state signal of the high voltage loop of the battery pack to the first microcontroller; the second separation unit is configured to convert the state signal of the high voltage loop of the battery pack sampled by the second high voltage measurement subunit from a high voltage signal to a low voltage signal and transmit the converted state signal of the high voltage loop of the battery pack to the second microcontroller. And/or, the second transmission module further includes a third separation unit and a fourth separation unit; the third separation unit is configured to convert the second control instruction from the first microcontroller from a high voltage signal to a low voltage signal and transmit the converted second control instruction from the first microcontroller to the first high voltage control unit and the second high voltage control unit; the fourth separation unit is configured to convert the second control instruction from the second microcontroller from a high voltage signal to a low voltage signal and transmit the converted second control instruction from the second microcontroller to the first high voltage control unit and the second high voltage control unit.

In one example, the battery monitoring module is located in a high voltage region, and the first microcontroller and the second microcontroller are located in a low voltage region; the first transmission module is configured to convert the state signal of the battery pack monitored by the battery monitoring module from a high voltage signal to a low voltage signal and transmit the converted state signal of the battery pack to the first microcontroller and the second microcontroller.

In one example, the high voltage measurement unit is located in a high voltage region, and the first microcontroller and the second microcontroller are located in a low voltage region; the second transmission module is configured to convert the state signal of the high voltage loop of the battery pack sampled by the high voltage measurement unit from a high voltage signal to a low voltage signal and transmit the converted state signal of the high voltage loop of the battery pack to the first microcontroller and the second microcontroller.

Embodiments of the present invention further provide a battery management system. The battery management system includes: a battery monitoring module, a first microcontroller, a second microcontroller, and a sampling control module. The first microcontroller is connected to the second microcontroller. The battery monitoring module is configured to monitor a state of a battery pack, and transmit the state of the battery pack to the first microcontroller and/or the second microcontroller respectively via a state signal of the battery pack, and control the state of the battery pack according to a first control instruction from the first microcontroller and the second microcontroller. The sampling control module is configured to detect a state of a high voltage loop of the battery pack, and transmit the state of the high voltage loop of the battery pack to the first microcontroller and the second microcontroller respectively via a state signal of the high voltage loop of the battery pack, and control the state of the high voltage loop of the battery pack according to a second control instruction from the first microcontroller and the second microcontroller. When the first microcontroller and the second microcontroller are in normal operation, the first microcontroller and the second microcontroller individually acquire at least a part of the state signal of the battery pack and the state signal of the high voltage loop of the battery pack, and cooperate with each other according to individually acquired state signals, perform a control on the battery pack and the battery management system via the battery monitoring module and the sampling control module.

In one example, the second microcontroller controls the battery pack and the battery management system to be in a safe mode via the battery monitoring module and the sampling control module when the first microcontroller is out of operation.

In one example, the second microcontroller processes at least a part of the acquired state signal of the battery pack and the acquired state signal of the high voltage loop of the battery pack, and transmits a processing result to the first microcontroller; the first microcontroller performs the control on the battery pack and the battery management system via the battery monitoring module and the sampling control module after the processing result of the second microcontroller is validated by the first microcontroller and passes the validation.

In one example, the sampling control module includes a high voltage measurement unit, a first high voltage control unit and a second high voltage control unit; the high voltage measurement unit is configured to obtain the state signal of the high voltage loop of the battery pack by sampling, and transmit the state signal of the high voltage loop of the battery pack to the first microcontroller and the second microcontroller; the first high voltage control unit is configured to control a state of a first switching unit in the high voltage loop of the battery pack according to the second control instruction from the first microcontroller and/or the second microcontroller; the second high voltage control unit is configured to control a state of a second switching unit in the high voltage loop of the battery pack according to the second control instruction from the first microcontroller and/or the second microcontroller.

In one example, the battery management system further includes one or both of a first transmission module and a second transmission module. The battery monitoring module transmits a part of the state signal of the battery pack to the first microcontroller and transmits the other part of the state signal of the battery pack to the second microcontroller via the first transmission module. The second transmission module is configured to transmit a part of the state signal of the high voltage loop of the battery pack sampled by the high voltage measurement unit to the first microcontroller, and transmit the other part of the state signal of the high voltage loop of the battery pack sampled by the high voltage measurement unit to the second microcontroller; and/or, transmit the second control instruction from the first microcontroller to the first high voltage control unit and/or the second high voltage control unit, and transmit the second control instruction from the second microcontroller to the first high voltage control unit and/or the second high voltage control unit; or, the second transmission module is configured to transmit the whole of the state signal of the high voltage loop of the battery pack sampled by the high voltage measurement unit to the first microcontroller and the second microcontroller respectively; and/or, transmit the second control instruction from the first microcontroller to the first high voltage control unit and/or the second high voltage control unit, and transmit the second control instruction from the second microcontroller to the first high voltage control unit and/or the second high voltage control unit.

In one example, the high voltage measurement unit includes a first high voltage measurement subunit and a second high voltage measurement subunit; the first high voltage measurement subunit is configured to obtain the state signal of the high voltage loop of the battery pack by sampling, and transmit the state signal of the high voltage loop of the battery pack to the first microcontroller via the second transmission module; the second high voltage measurement subunit is configured to obtain the state signal of the high voltage loop of the battery pack by sampling, and transmit the state signal of the high voltage loop of the battery pack to the second microcontroller via the second transmission module.

In one example, the second transmission module includes a first separation unit and a second separation unit; the first separation unit is configured to convert the state signal of the high voltage loop of the battery pack sampled by the first high voltage measurement subunit from a high voltage signal to a low voltage signal and transmit the converted state signal of the high voltage loop of the battery pack to the first microcontroller; the second separation unit is configured to convert the state signal of the high voltage loop of the battery pack sampled by the second high voltage measurement subunit from a high voltage signal to a low voltage signal and transmit the converted state signal of the high voltage loop of the battery pack to the second microcontroller. And/or, the second transmission module further includes a third separation unit and a fourth separation unit; the third separation unit is configured to convert the second control instruction from the first microcontroller from a high voltage signal to a low voltage signal and transmit the converted second control instruction from the first microcontroller to the first high voltage control unit and/or the second high voltage control unit; the fourth separation unit is configured to convert the second control instruction from the second microcontroller from a high voltage signal to a low voltage signal and transmit the converted second control instruction from the second microcontroller to the first high voltage control unit and/or the second high voltage control unit.

In one example, the battery monitoring module is located in a high voltage region, and the first microcontroller and the second microcontroller are located in a low voltage region; the first transmission module is configured to convert the state signal of the battery pack monitored by the battery monitoring module from a high voltage signal to a low voltage signal and transmit a part of the converted state signal of the battery pack to the first microcontroller and transmit the other part of the converted state signal of the battery pack to the second microcontroller.

In one example, the first transmission module includes an separation unit and a communication unit; the separation unit is configured to convert the state signal of the battery pack monitored by the battery monitoring module from a high voltage signal to a low voltage signal and transmit a communication signal in the converted state signal of the battery pack to the first microcontroller via the communication unit; and the separation unit is configured to convert the first control instruction from the first microcontroller transmitted by the communication unit from a low voltage signal to a high voltage signal and transmit the converted first control instruction to the battery monitoring module; and the separation unit is configured to convert a fault diagnostic signal in the state signal of the battery pack from a high voltage signal to a low voltage signal and transmit the converted fault diagnostic signal to the second microcontroller.

In one example, the first transmission module includes an separation unit, a communication unit, and a control unit; the separation unit is configured to convert the state signal of the battery pack monitored by the battery monitoring module from a high voltage signal to a low voltage signal and transmit the converted state signal of the battery pack to the first microcontroller via the communication unit and transmit the converted state signal of the battery pack to the control unit, or the separation unit is configured to transmit a part of the converted state signal of the battery pack to the first microcontroller via the communication unit and transmit the other part of the converted state signal of the battery pack to the control unit; the control unit determines a diagnosis result of the state of the battery pack according to the acquired state signal of the battery pack, and transmits the diagnosis result to the second microcontroller.

In one example, the high voltage measurement unit is located in a high voltage region, and the first microcontroller and the second microcontroller are located in a low voltage region; the second transmission module is configured to convert the state signal of the high voltage loop of the battery pack sampled by the high voltage measurement unit from a high voltage signal to a low voltage signal and transmit a part of the converted state signal of the high voltage loop of the battery pack to the first microcontroller and transmit the other part of the converted state signal of the high voltage loop of the battery pack to the second microcontroller; or, the second transmission module is configured to convert the state signal of the high voltage loop of the battery pack sampled by the high voltage measurement unit from a high voltage signal to a low voltage signal and transmit the converted state signal of the high voltage loop of the battery pack to the first microcontroller and the second microcontroller respectively.

Compared with the existing technologies, embodiments of the present disclosure provides two microcontrollers in the battery management system and the two microcontrollers operate simultaneously and independently control the battery management system, or one microcontroller operates and the other microcontroller is in a standby state, thereby avoiding a great risk to the safe operation of the whole vehicle caused by a fault occurred in the microcontroller when a control function is achieved independently by one microcontroller in the existing battery management system, and improving safety of the battery management system and even the whole vehicle. Moreover, the microcontroller in the battery management system does not need to interact with a vehicle controller unit (VCU) for a large number of diagnostic signals, thereby improving robustness of the system.

Alternatively, two microcontrollers are provided in the battery management system and the two microcontrollers operate simultaneously and cooperate with each other to control the battery management system, thereby avoiding a great risk to the safe operation of the whole vehicle caused by a fault occurred in the microcontroller when the control function is achieved independently by one microcontroller in the existing battery management system, and improving safety of the battery management system and even the whole vehicle. Moreover, the microcontroller in the battery management system does not need to interact with the VCU for a large number of diagnostic signals, thereby improving robustness of the system.

BRIEF DESCRIPTION OF THE DRAWINGS

One or more embodiments are illustrated by figures in accompanying drawings. The exemplary descriptions do not constitute a limitation on the embodiments, and elements in the figures having the same reference numerals represent similar elements. The figures in the accompanying drawings do not constitute a scale limitation unless otherwise stated.

DETAILED DESCRIPTION

Figure 1:
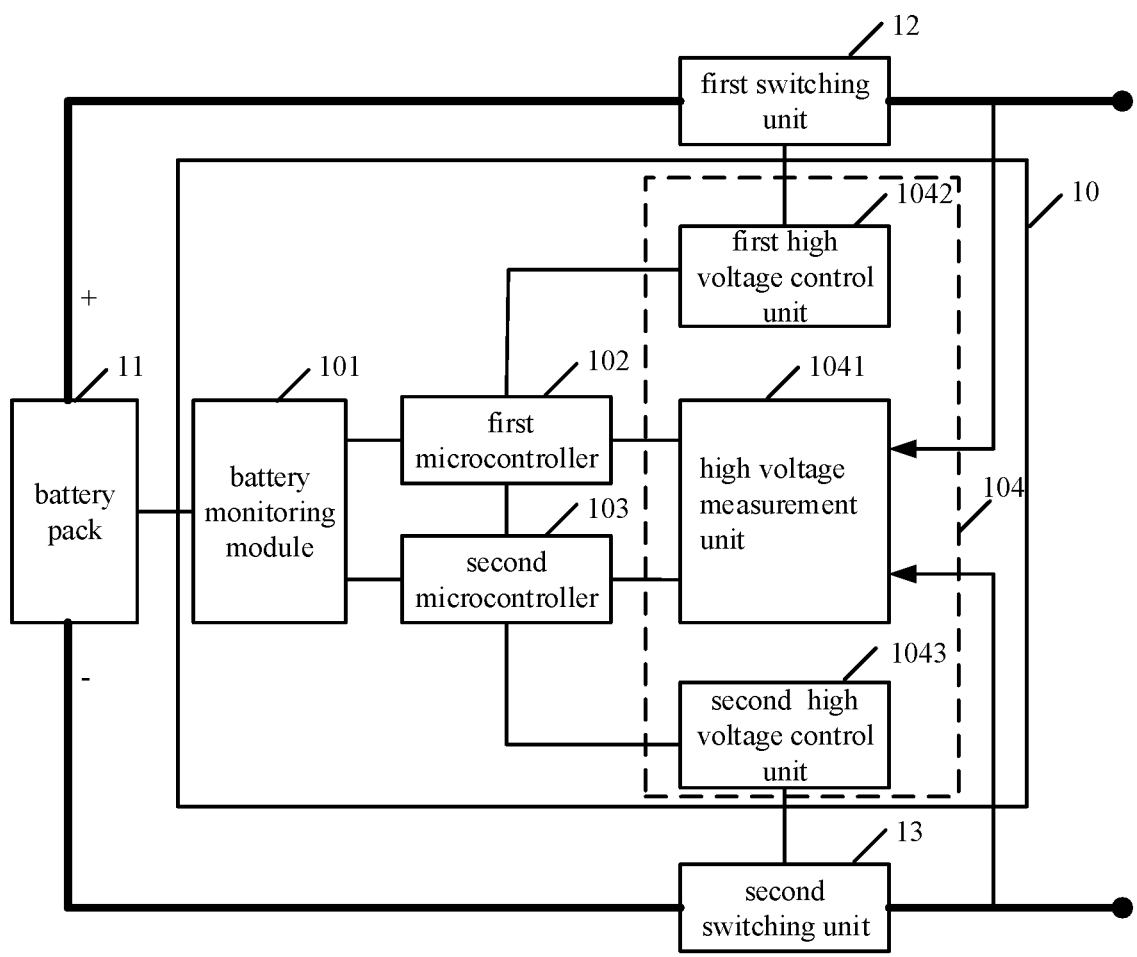
FIG. 1 is a structural diagram of a battery management system according to some embodiments of the present disclosure.

Embodiments of the present disclosure will be described in detail below with reference to accompanying drawings to make objectives, technical solutions and advantages of the embodiments of the present disclosure more clear. However, it will be understood by those skilled in the art that, in each of the embodiments of the present disclosure, various technical details are set forth in order to make the reader better understand the present application. However, the technical solutions claimed in the present disclosure can be implemented without these technical details and various changes and modifications based on following embodiments.

Serial numbers themselves for components herein, such as "first", "second", and the like, are only used to distinguish described objects, and do not have any order or technical meaning. As used herein, "connected" or "coupled", unless otherwise specified, comprises both direct and indirect connections (couples).

A description of "A and/or B" herein and a similar description are used to express the meaning of including any one of A and B and including both A and B.

The inventors found that state information of a battery pack of the electric vehicles is monitored by a battery management system. Currently, in a general design of the industry, all control logics and measurements in the battery management system are stored in one microcontroller in the form of program, to realize the management of cell by the battery management system and the communication and information exchange with a vehicle controller unit (VCU). However, the battery management system will lose functions of battery voltage and temperature acquisition, insulation monitoring, relay control, and the like, once a fault occurs in the microcontroller. As a central brain of the battery management system, once a fault occurs in a microcontroller, a great risk to the whole vehicle may occur, and the function of vehicle will be greatly affected, even the life safety of people inside the vehicle will be threatened. Although there are solutions to solve an impact of a single microcontroller to be out of control as much as possible in a way of enabling mutual supervision between the battery management system and the VCU by designing a strategy of mutual diagnosis between the battery management system and the VCU, a large number of diagnostic signals in this way increase the complexity of software and reduce the robustness of system. Moreover, functions independently undertaken by the microcontroller in the battery management system cannot be achieved by a way of increasing mutual diagnosis with the VCU after the microcontroller is out of operation.

In view of the above, embodiments of the present disclosure provide a battery management system that enables increased safety of operation and improved robustness of the battery management system.

Since there is only one microcontroller in the existing battery management system, the whole vehicle will have a great risk when a fault occurs in the microcontroller. In order to solve this problem, embodiments of the present disclosure provide a battery management system, in which two microcontrollers are provided. By designing a redundant microcontroller, invalidation of one of the microcontrollers can be effectively recognized by the other microcontroller and functions of the battery management system can be maintained normal for a certain period of time, so that the vehicle can be in a safe mode. For example, when the vehicle is in a safe mode, the effective microcontroller can control a voltage output of the high voltage loop, so that the vehicle is driven by a limited power.

In the following embodiments, the battery pack is a power supply for a high voltage component, and is generally composed of a battery cell such as a lithium battery or a lead acid battery.

As shown in FIG. 1, an embodiment of the present disclosure provides a battery management system 10 which includes a battery monitoring module 101, a first microcontroller 102, a second microcontroller 103, and a sampling control module 104. The first microcontroller 102 is connected to the second microcontroller 103.

The battery monitoring module 101 is configured to monitor the state of the battery pack 11 and transmit the state of the battery pack 11 to the first microcontroller 102 and the second microcontroller 103 respectively via a state signal of the battery pack 11, and control the state of the battery pack 11 according to a first control instruction from the first controller 102 and the second microcontroller 103.

Specifically, the battery monitoring module is directly connected to the battery pack and collects battery parameters of the battery pack. The battery parameters include cell voltage of the battery pack, temperature of the battery pack, and the like, and can reflect the state of the battery pack. Moreover, the battery monitoring module has a function of battery pack equalization that utilizes power electronic technology to keep a voltage deviation of the battery pack within a desired range, thereby ensuring that each battery cell maintains the same state during normal use to avoid occurrence of overcharge and over-discharge. The battery monitoring module may output two signals, one of the two signals is communication signal for transmitting the collected battery parameters of the battery pack and receiving the first control instruction from the first microcontroller and/or the second microcontroller, and the other of the two signals is internal fault diagnostic signal that is transmitted to the first microcontroller and/or the second microcontroller for battery pack fault monitoring.

The sampling control module 104 is configured to monitor the state of the high voltage loop of the battery pack, transmit the state of the high voltage loop of the battery pack to the first microcontroller 102 and the second microcontroller 103 respectively via a state signal of the high voltage loop of the battery pack, and control the state of the high voltage loop of the battery pack according to the second control instruction from the first microcontroller 102 and the second microcontroller 103. For example, the sampling control module performs voltage sampling, insulation monitoring, current sampling, and the like, on the high voltage loop of the battery pack to monitor the high voltage loop of the battery pack. The high voltage loop of the battery pack includes a circuit loop which starts from the positive terminal of the battery pack, passes through a first switching unit 12, a back-end load, a second switching unit 13 and finally returns to the negative terminal of the battery pack.

When the first microcontroller 102 and the second microcontroller 103 are in normal operation, the first microcontroller 102 and the second microcontroller 103 individually acquire the state signal of the battery pack 11 and the state signal of the high voltage loop of the battery pack, and each of the first microcontroller 102 and the second microcontroller 103 independently performs a control on the battery pack 11 and the battery management system 10 via the battery monitoring module 101 according to the state signal of the battery pack 11 and via the sampling control module 104 according to the state signal of the high voltage loop of the battery pack. Alternatively, the first microcontroller 102 independently performs the control of the battery pack 11 and the battery management system 10 via the battery monitoring module 101 according to the state signal of the battery pack 11 and via the sampling control module 104 according to the state signal of the high voltage loop of the battery pack, and the second microcontroller 103 is in a standby state. In the standby state, the second microcontroller 103 acquires the state signal of battery pack 11 and the state signal of the high-voltage loop of the battery pack and monitors the state of the first microcontroller 102, but does not performs the control on the battery pack 11 and the battery management system 10.

In one example, if each of the first microcontroller 102 and the second microcontroller 103 independently perform the control on the battery pack 11 and the battery management system 10 via the battery monitoring module 101 according to the state signal of the battery pack 11 and via the sampling control module 104 according to the state signal of the high voltage loop of the battery pack, the effective microcontroller independently performs the management and control on the battery pack 1 lwhen either of the first microcontroller 102 and the second microcontroller 103 is out of operation.

In another example, if the first microcontroller 102 independently performs the control on the battery pack 11 and the battery management system 10 via the battery monitoring module 101 according to the state signal of the battery pack 11 and via the sampling control module 104 according to the state signal of the high voltage loop of the battery pack, and the second microcontroller 103 is in a standby state, the second microcontroller 103 independently performs the control on the battery pack 11 and the battery management system 10 via the battery monitoring module 101 according to the state signal of the battery pack 11 and via the sampling control module 104 according to the state signal of the high voltage loop of the battery pack when the second microcontroller detects that the first microcontroller is out of operation.

In one example, the sampling control module 104 includes a high voltage measurement unit 1041, a first high voltage control unit 1042, and a second high voltage control unit 1043. The high voltage measurement unit 1041 is configured to obtain the state signal of the high voltage loop of the battery pack by sampling, and transmit the state signal of the high voltage loop of the battery pack to the first microcontroller 102 and the second microcontroller 103.

The first high voltage control unit 1042 and the second high voltage control unit 1043 may be controlled by either of the first microcontroller 102 and the second microcontroller 103, or may be controlled by both of the first microcontroller 102 and the second microcontroller 103. Specifically, the first high voltage control unit 1042 is configured to control a state of a first switching unit 12 in the high voltage loop of the battery pack according to the second control instruction from the first microcontroller 102 and/or the second microcontroller 103. The second high voltage control unit 1043 is configured to control a state of a second switching unit 13 in the high voltage loop of the battery pack according to the second control instruction from the first microcontroller 102 and/or the second microcontroller 103. Specifically, the first switching unit 12 and the second switching unit 13 may be controllable switching components, such as relays, fuses, and the like. The first switching unit and the second switching unit are configured to control energy transfer of the battery pack. The first switching unit may be a positive switch of the battery pack, and the second switching unit may be a negative switch of the battery pack. The first microcontroller and the second microcontroller monitor high voltage information via the high voltage measurement unit, and perform arithmetic processing on the monitored data, and then perform the control on the whole battery management system by certain interaction logic. Specifically, the high voltage measurement unit may include a high voltage sampling subunit, an insulation detecting subunit, a current sampling subunit, and the like.

In an embodiment of the present disclosure, the first microcontroller and the second microcontroller are in an equal relationship, that is, the two microcontrollers have the same capability and control the whole battery management system jointly. Alternatively, the first microcontroller and the second microcontroller are in an alternative relationship, that is, the first microcontroller control the whole battery management system independently and the second microcontroller is in a standby state under normal condition, and the second microcontroller is activated by a signal and the battery management system is controlled by the second microcontroller when an abnormal situation, such as a fault, occurs in the first microcontroller.

In an embodiment of the present disclosure, two microcontrollers are provided in the battery management system and the two microcontrollers operate simultaneously and independently control the battery management system, or one microcontroller operates and the other microcontroller is in a standby state, thereby avoiding a great risk to the safe operation of the whole vehicle caused by a fault occurred in the microcontroller when one microcontroller in the existing battery management system independently performs a control function, and improving safety of the battery management system and even the whole vehicle. Moreover, the microcontroller in the battery management system does not need to interact with the VCU for a large number of diagnostic signals, thereby improving robustness of the system.

Moreover, two microcontrollers can monitor and back up data for each other by a redundant design of microcontroller, thereby improving reliability of design. The two microcontrollers can jointly control the control component of the high voltage loop of the battery pack, thereby avoiding the case that a failure occurred in one microcontroller will cause a fault of the whole battery management system and an abnormality of the external high voltage output.

An embodiment of the present disclosure provides a battery management system. The structure of the battery management system is the same as that of the above battery management system, and the detail may be referred to FIG. 1. The similarities may be referred to the specific description of the above embodiment, and the description thereof will not be repeated here.

In the embodiment of the present disclosure, the battery monitoring module 101 transmits a state of the battery pack 11 to the first microcontroller 102 and/or the second microcontroller 103 via a state signal of the battery pack 11, and the first microcontroller 102 and the second microcontroller 103 individually acquire at least a part of the state signal of the battery pack 11 and the state signal of the high voltage loop of the battery pack when the first microcontroller 102 and the second microcontroller 103 are in normal operation, and cooperate with each other according to the individually acquired state signals, perform the control on the battery pack 11 and the battery management system 10 via the battery monitoring module 101 and the sampling control module 104.

In one example, the second microcontroller 103 controls the battery pack 11 and the battery management system 10 to be in a safe mode via the battery monitoring module 101 and the sampling control module 104 when the first microcontroller 102 is out of operation.

In another example, the second microcontroller 103 processes at least a part of the acquired state signal of the battery pack 11 and the acquired state signal of the high voltage loop of the battery pack, and transmits a processing result to the first microcontroller 102. The first microcontroller 102 performs the control on the battery pack 11 and the battery management system 10 via the battery monitoring module 101 and the sampling control module 104 after the processing result of the second microcontroller 103 is validated by the first microcontroller and passes the validation.

In an embodiment of the present disclosure, the first microcontroller 102 and the second microcontroller 103 cooperate to perform the control on the battery management system. The first microcontroller 102 and the second microcontroller 103 are in a complementary relationship. The first microcontroller 102 and the second microcontroller 103 have different duties and are independent of each other with complementary responsibilities, and each of them controls a part of functions of the system independently.

Alternatively, the first microcontroller 102 and the second microcontroller 103 are in a cooperative relationship. For example, the first microcontroller 102 is responsible for the major functions of the whole battery management system 10, and the second microcontroller is responsible for the minor functions. The second microcontroller may perform data calculation synchronously for some important functions responsible by the first microcontroller, and send the calculation result to the first microcontroller for verification, thereby enhancing system reliability. Taking the control of the battery monitoring module as an example, the first microcontroller receives data information of the battery monitoring module and sends a first control instruction to the battery monitoring module; while the second microcontroller receives a diagnostic information of the battery monitoring module and processes it by an internal diagnostic control logic, then perform a fault processing on the whole battery management system by an information interaction with the first microcontroller.

The auxiliary microcontroller assists the dominant microcontroller to make a judgement by monitoring or receiving the same information, and assists the dominant microcontroller to perform partial function of control to prevent a fault occurred in a back-end load directly caused by a failure of the dominant microcontroller. For example, if the dominant microcontroller directly controls a positive switch and a negative switch when the high voltage loop of the battery pack is turned on unexpectedly, the positive switch and the negative switch will be turned on or turned off at the same time once a fault occurs in the dominant microcontroller, thereby resulting in a system fault. If the auxiliary microcontroller performs a real-time monitoring on the system fault by some independent monitoring information and directly controls the system to be in a safe mode in a case of some serious faults, it can effectively prevent the case that the dominant microcontroller may not identify a fault based on the monitored data as soon as possible because of a large amount of data logic to be processed. For example, the auxiliary microcontroller directly acquires a fault diagnostic signal of the battery monitoring module and directly turns off the negative switch when determining that a serious fault occurs, thereby improving a response speed to the fault. Or, the auxiliary microcontroller can prevent the case that the battery management system is suddenly out of control because of a failure of the dominant microcontroller which puts the vehicle in danger. For example, an auxiliary microcontroller can control a voltage output of the high voltage loop, so that the vehicle is driven by a limited power to a safe environment when determining that a fault occurs.

In an embodiment of the present disclosure, two microcontrollers are provided in the battery management system and the two microcontrollers operate simultaneously and cooperate with each other to control the battery management system, thereby avoiding a great risk to the safe operation of the whole vehicle caused by a fault occurred in the microcontroller when a microcontroller in the existing battery management system independently undertakes the control function, and improving safety of the battery management system and even the whole vehicle. Moreover, the microcontroller in the battery management system does not need to interact with a VCU for a large number of diagnostic signals, thereby improving robustness of the system.

Moreover, one of the two microcontrollers is the dominant microcontroller, and the other microcontroller is the auxiliary microcontroller. The auxiliary microcontroller assists the dominant microcontroller to perform some processing tasks, thereby reducing the load of a single microcontroller.

It should be noted that, FIG. 1 only exemplifies the case that the first microcontroller directly controls the first high voltage control unit and the second microcontroller directly controls the second high voltage control unit, which is applied to the above embodiment. If the first microcontroller controls the second high voltage control unit directly in addition to controlling the first high voltage control unit, the first microcontroller is simultaneously connected to the first high voltage control unit and the second high voltage control unit. Similarly, if the second microcontroller controls the first high voltage control unit directly in addition to controlling the second high voltage control unit, the second microcontroller is simultaneously connected to the first high voltage control unit and the second high voltage control unit.

An embodiment of the present disclosure provides a battery management system. A transmission module is provided in the battery management system according to actual needs. The content that has been described in the above embodiments will not be repeated here.

Figure 2:
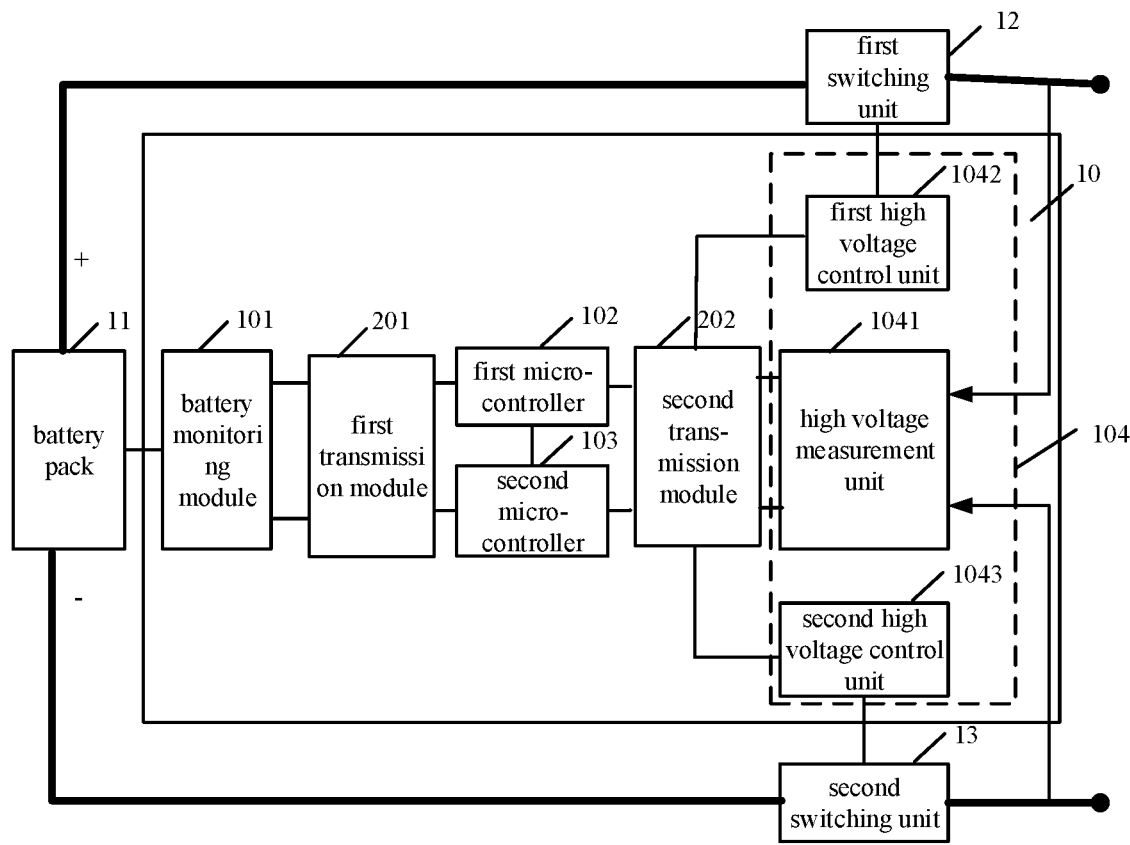
FIG. 2 is another structural diagram of a battery management system according to some embodiments of the present disclosure.

Specifically, as shown in FIG. 2, the battery management system 10 further includes a first transmission module 201. The battery monitoring module 101 transmits a state signal of the battery pack 11 to the first microcontroller 102 and the second microcontroller 103 via the first transmission module 201.

Assuming that the battery monitoring module 101 is located in a high voltage region, and the first microcontroller 102 and the second microcontroller 103 are located in a low voltage region, the first transmission module 201 is configured to convert the state signal of the battery pack 11 monitored by the battery monitoring module 101 from a high voltage signal to a low voltage signal, and transmit the converted state signal of the battery pack 11 to the first microcontroller 102 and the second microcontroller 103.

Specifically, the battery management system 10 further includes a second transmission module 202. The second transmission module 202 is configured to transmit a state signal of the high voltage loop of the battery pack sampled by the high voltage measurement unit 1041 to the first microcontroller 102 and the second microcontroller 103. And/or, the second transmission module 202 is configured to transmit a second control instruction from the first microcontroller 102 to the first high voltage control unit 1042 and/or the second high voltage control unit 1043, and transmit a second control instruction from the second microcontroller 103 to the first high voltage control unit 1042 and/or the second high voltage control unit 1043.

Figure 3:
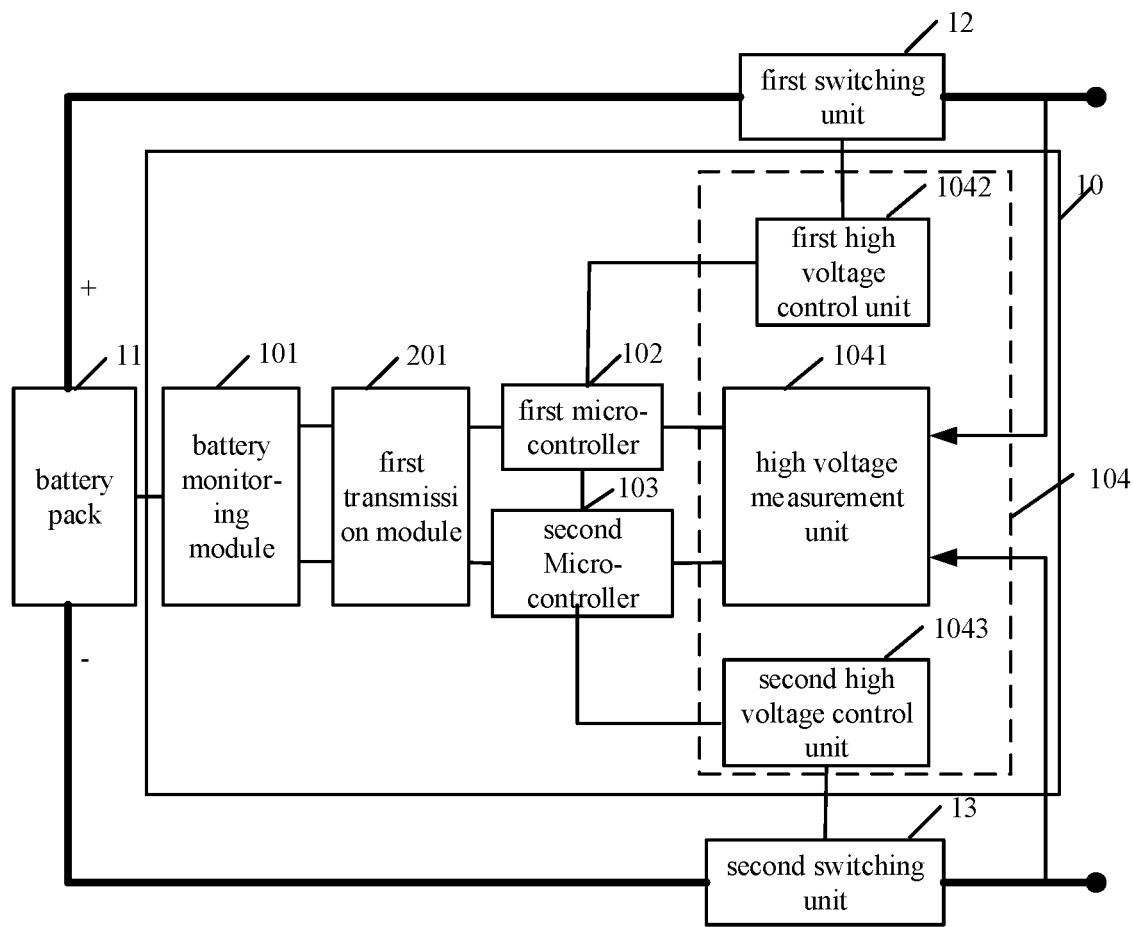
FIG. 3 is another structural diagram of a battery management system according to some embodiments of the present disclosure.
Figure 4:
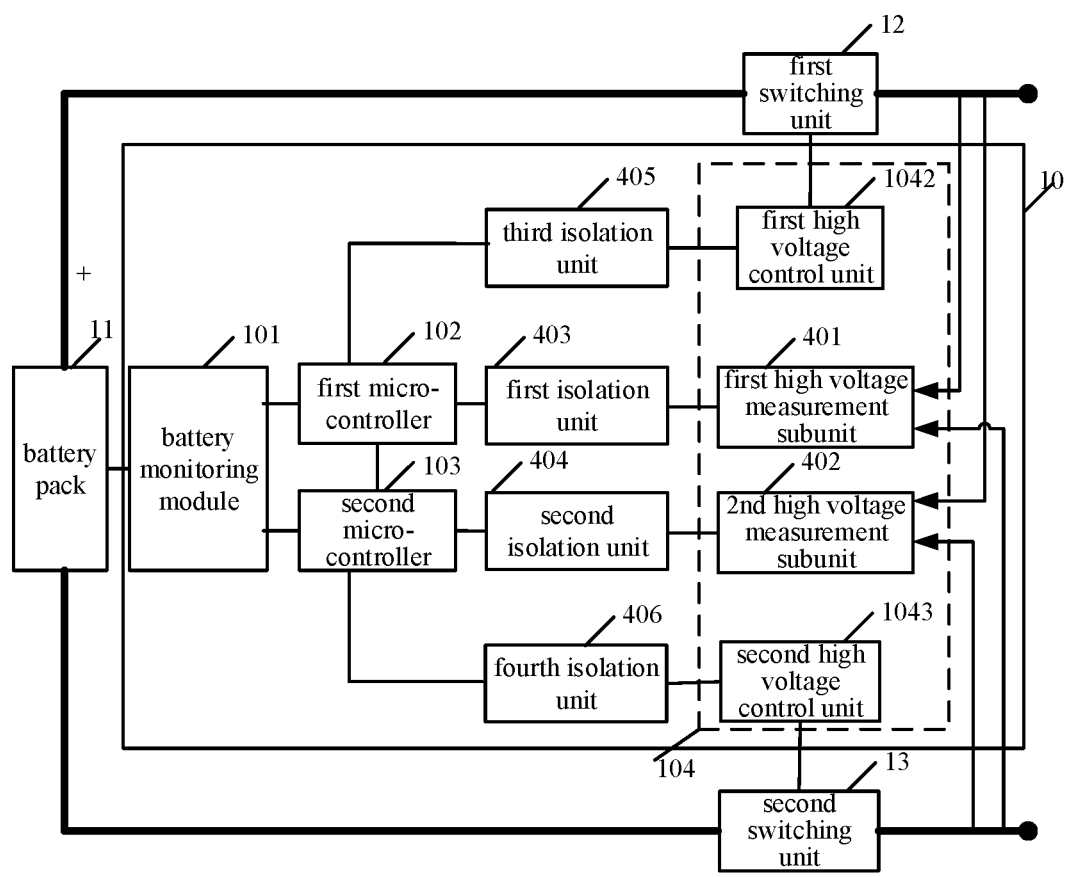
FIG. 4 is another structural diagram of a battery management system according to some embodiments of the present disclosure.

It should be noted that the first transmission module 201 and the second transmission module 202 may be simultaneously provided in the battery management system 10, or only the first transmission module 201 may be provided in the battery management system 10 as shown in FIG. 3, or only the second transmission module 202 may be provided in the battery management system 10 as shown in FIG. 4.

Specifically, the high voltage measurement unit 1041 includes a first high voltage measurement subunit 401 and a second high voltage measurement subunit 402. As shown in FIG. 4, the first high voltage measurement subunit 401 is configured to obtain a state signal of the high voltage loop of the battery pack by sampling, and transmit the state signal of the high voltage loop of the battery pack to the first microcontroller 102 via the second transmission module 202 when the second transmission module 202 is provided. The second high voltage measurement subunit 402 is configured to obtain the state signal of the high voltage loop of the battery pack by sampling, and transmit the state signal of the high voltage loop of the battery pack to the second microcontroller 103 via the second transmission module 202.

Assuming that the high voltage measurement unit 1041 is located in a high voltage region, and the first microcontroller 102 and the second microcontroller 103 are located in a low voltage region, the second transmission module 202 is configured to convert the state signal of the high voltage loop of the battery pack sampled by the high voltage measurement unit 1041 from a high voltage signal to a low voltage signal and transmit the converted state signal of the high voltage loop of the battery pack to the first microcontroller 102 and the second microcontroller 103.

In one example, the second transmission module 202 includes a first separation unit 403 and a second separation unit 404. As shown in FIG. 4, the first separation unit 403 is configured to convert a state signal of the high voltage loop of the battery pack sampled by the first high voltage measurement subunit 401 from a high voltage signal to a low voltage signal and transmit the converted state signal of the high voltage loop of the battery pack to the first microcontroller 102. The second separation unit 404 is configured to convert a state signal of the high voltage loop of the battery pack sampled by the second high voltage measurement subunit 402 from a high voltage signal to a low voltage signal and transmit the converted state signal of the high voltage loop of the battery pack to the second microcontroller 103.

The first separation unit and the second separation unit are provided with a separation function and a communication function. Herein, the separation function can be performed by any one of a transformer, a capacitor, a separation chip, and the like.

It should be noted that, FIG. 4 only exemplifies a case that the first high voltage measurement subunit is connected to the first microcontroller, and the second high voltage measurement subunit is connected to the second microcontroller. The first high voltage measurement subunit can be simultaneously connected to the first microcontroller and the second microcontroller, and the second high voltage measurement subunit can be simultaneously connected to the first microcontroller and the second microcontroller. That is, the first microcontroller and the second microcontroller may acquire data of the same high voltage measurement subunit jointly or acquire data of the different high voltage measurement subunits respectively.

Moreover, it should be noted that, FIG. 4 only exemplifies a case that the first high voltage measurement subunit and the second high voltage measurement subunit have the same monitoring function. Naturally, the first high voltage measurement subunit may monitor a branch where the positive switch of the battery pack is located, and the second high voltage measurement subunit may monitor a branch where the negative switch of the battery pack is located.

Assuming that the first high voltage control unit 1042 and the second high voltage control unit 1043 are both located in a low voltage region, and the first microcontroller 102 and the second microcontroller 103 are both located in a high voltage region, the second transmission module may further include a third separation unit 405 and a fourth separation unit 406. The third separation unit 405 is configured to convert a second control instruction from the first microcontroller 102 from a high voltage signal to a low voltage signal and transmit the converted second control instruction from the first microcontroller 102 to the first high voltage control unit 1042 and the second high voltage control unit 1043, and the fourth separation unit 406 is configured to convert a second control instruction from the second microcontroller 103 from a high voltage signal to a low voltage signal and transmit the converted second control instruction from the second microcontroller 103 to the first high voltage control unit 1042 and the second high voltage control unit 1043.

Similarly, assuming that the first high voltage control unit 1042 and the second high voltage control unit 1043 are both located in a high voltage region, and the first microcontroller 102 and the second microcontroller 103 are both located in a low voltage region, the third separation unit 405 is configured to convert a second control instruction from the first microcontroller 102 from a low voltage signal to a high voltage signal and transmit the converted second control instruction from the first microcontroller to the first high voltage control unit 1042 and the second high voltage control unit 1043, and the fourth separation unit 406 is configured to convert a second control instruction from the second microcontroller 103 from a low voltage signal to a high voltage signal to the first high voltage control unit 1042 and the second high voltage control unit 1043.

In an embodiment of the present disclosure, double sampling can be performed in real time and the accuracy of fault judgment can be improved by a redundant design of the high voltage measurement.

An embodiment of the present disclosure provides a battery management system. A transmission module is provided in the battery management system according to actual needs. The content that has been described in the above embodiments will not be repeated here.

As shown in FIG. 2, the battery monitoring module 101 transmits a part of the state signal of the battery pack to the first microcontroller 102 and transmits the other part of the state signal of the battery pack 11 to the second microcontroller 103 via the first transmission module 201.

The second transmission module 202 is configured to transmit a part of the state signal of the high voltage loop of the battery pack sampled by the high voltage measurement unit 1041 to the first microcontroller 102, and transmit the other part of the state signal of the high voltage loop of the battery pack sampled by the high voltage measurement unit 1041 to the second microcontroller 103. Alternatively, the second transmission module 202 is configured to transmit the whole of the state signal of the high voltage loop of the battery pack sampled by the high voltage measurement unit 1041 to the first microcontroller 102 and the second microcontroller 103, respectively.

It should be noted that the first transmission module 201 and the second transmission module 202 may be simultaneously provided in the battery management system 10, or only the first transmission module 201 may be provided in the battery management system 10 as shown in FIG. 3, or only the second transmission module 202 may be provided in the battery management system 10 as shown in FIG. 4.

Assuming that the battery monitoring module 101 is located in a high voltage region, and the first microcontroller 102 and the second microcontroller 103 are located in a low voltage region, the first transmission module 201 is configured to convert the state signal of the battery pack monitored by the battery monitoring module 101 from a high voltage signal to a low voltage signal and transmit a part of the converted state signal of the battery pack 11 to the first microcontroller 102 and transmit the other part of the converted state signal of the battery pack 11 to the second microcontroller 103.

Assuming that the battery monitoring module 101, the first microcontroller 102, and the second microcontroller 103 are all located in a high voltage region, the first microcontroller 102 and the second microcontroller 103 may directly acquire the data of the battery monitoring module 101 without providing the first transmission module 201. The second transmission module is only provided between the first microcontroller 102, the second microcontroller 103 and the sampling control module 104 to perform high and low voltage signal separation.

Assuming that the high voltage measurement unit 1041 is located in a high voltage region, and the first microcontroller 102 and the second microcontroller 103 are located in a low voltage region, the second transmission module 202 is configured to convert the state signal of the high voltage loop of the battery pack sampled by the high voltage measurement unit 1041 from a high voltage signal to a low voltage signal and transmit a part of the converted state signal of the high voltage loop of the battery pack to the first microcontroller 102, and transmit the other part of the converted state signal of the high voltage loop of the battery pack to the second microcontroller 103. Alternatively, the second transmission module 202 is configured to convert the state signal of the high voltage loop of the battery pack sampled by the high voltage measurement unit 1041 from a high voltage signal to a low voltage signal and transmit the converted state signal of the high voltage loop of the battery pack to the first microcontroller 102 and the second microcontroller 103 respectively.

Assuming that the high voltage measurement unit 1041, the first microcontroller 102 and the second microcontroller 103 are all located in the low voltage region, there is no need to provide a second transmission module between the high voltage measurement unit and the first microcontroller, the second microcontroller, and data interaction can be directly performed. Similarly, assuming that the high voltage measurement unit 1041, the first microcontroller 102 and the second microcontroller 103 are all located in the high voltage region, there is also no need to provide a second transmission module between the high voltage measurement unit and the first microcontroller, the second microcontroller, and data interaction can be directly performed.

Assuming that the first microcontroller 102 and the second microcontroller 103 are located in a high voltage region, the first high voltage control unit 1042 and the second high voltage control unit 1043 are located in a low voltage region, the second transmission module further includes a third separation unit 405 and a fourth separation unit 406. Herein, the third separation unit 405 is configured to convert a second control instruction from the first microcontroller 102 from a high voltage signal to a low voltage signal and transmit the converted second control instruction from the first microcontroller 102 to the first high voltage control unit 1042 and/or the second high voltage control unit 1043, and the fourth separation unit 406 is configured to convert a second control instruction from the second microcontroller 103 from a high voltage signal to a low voltage signal and transmit the converted second control instruction from the second microcontroller 103 to the first high voltage control unit 1042 and/or the second high voltage control unit 1043.

Similarly, assuming that the first high voltage control unit 1042 and the second high voltage control unit 1043 are both located in a high voltage region, and the first microcontroller 102 and the second microcontroller 103 are both located in a low voltage region, the third separation unit 405 is configured to convert a second control instruction from the first microcontroller 102 from a low voltage signal to a high voltage signal and transmit the converted second control instruction from the first microcontroller 102 to the first high voltage control unit 1042 and/or the second high voltage control unit 1043, and the fourth separation unit 406 is configured to convert a second control instruction from the second microcontroller 103 from a low voltage signal to a high voltage signal and transmit the converted second control instruction from the second microcontroller 103 to the first high voltage control unit 1042 and/or the second high voltage control unit 1043.

By such analogy, a separation unit is required for communication between the high voltage region and the low voltage region. The figure shows the case that the third separation unit and the fourth separation unit are simultaneously provided, or only the third separation unit or the fourth separation unit is provided as needed. The principle thereof is the same as above.

Figure 5:
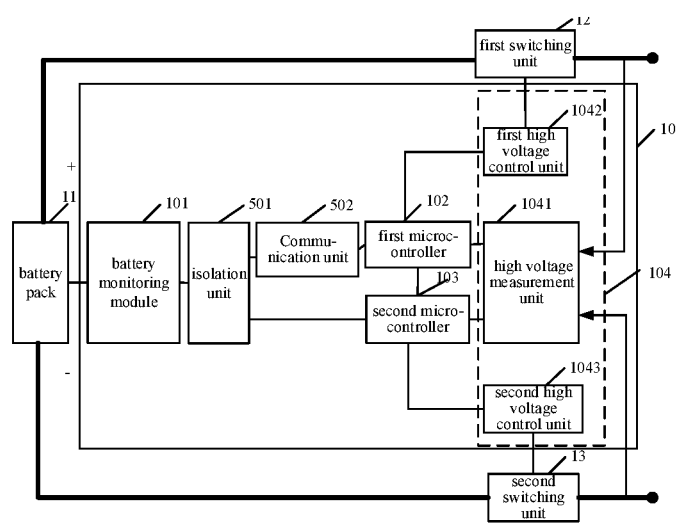
FIG. 5 is another structural diagram of a battery management system according to some embodiments of the present disclosure.

In an example, as shown in FIG. 5, the first transmission module 201 includes a separation unit 501 and a communication unit 502.

The separation unit 501 is configured to convert a state signal of the battery pack 11 monitored by the battery monitoring module from a high voltage signal to a low voltage signal and transmit a communication signal in the converted state signal of the battery pack 11 to the first microcontroller 102 via the communication unit 502. And the separation unit is configured to convert a first control instruction from the first microcontroller 102 transmitted by the communication unit 502 from a low voltage signal to a high voltage signal and transmit the converted first control instruction to the battery monitoring module 101, and convert a fault diagnostic signal in the state signal of the battery pack from a high voltage signal to a low voltage signal and transmit the converted fault diagnostic signal in the state signal of the battery pack to the second microcontroller 103.

Figure 6:
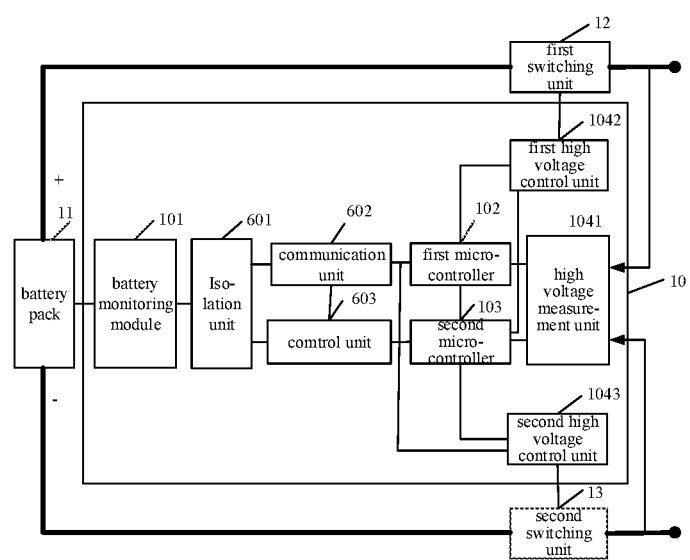
FIG. 6 is another structural diagram of a battery management system according to some embodiments of the present disclosure.

In another example, as shown in FIG. 6, the first transmission module 201 includes a separation unit 601, a communication unit 602, and a control unit 603.

The separation unit 601 is configured to convert a state signal of the battery pack 11 monitored by the battery monitoring module from a high voltage signal to a low voltage signal, and transmit the converted state signal of the battery pack 11 to the first microcontroller 102 via the communication unit 602 and transmit the converted state signal of the battery pack 11 to the control unit 603. Or the separation unit is configured to transmit a part of the converted state signal of the battery pack to the first microcontroller 102 via the communication unit 602 and the other part of the converted state signal to the control unit 603.

The control unit 603 determines a diagnosis result of the state of the battery pack based on the acquired state signal of the battery pack, and transmits the diagnosis result to the second microcontroller 103.

The communication unit in FIG. 5 and FIG. 6 may be composed of a plurality of communication subunits connected by a series of serial or parallel data communication manners such as a CAN bus or a daisy chain, and the communication unit may also be provided with a subunit with a data communication format conversion function as needed.

It should be noted that, similar to FIG. 1, FIG. 2, FIG. 3, and FIG. 4, only exemplify a case that the first microcontroller directly controls the first high voltage control unit and the second microcontroller directly controls the second high voltage control unit which is applied to the above embodiments. If the first microcontroller directly controls the second high voltage control unit in addition to the first high voltage control unit, the first microcontroller simultaneously connects to the first high voltage control unit and the second high voltage control unit. Similarly, if the second microcontroller directly controls the first high voltage control unit in addition to the second high voltage control unit, the second microcontroller simultaneously connects to the first high voltage control unit and the second high voltage control unit.

Similarly, FIG. 5 only exemplifies a case that the first microcontroller directly controls the first high voltage control unit and the second microcontroller directly controls the second high voltage control unit. If the first microcontroller directly controls the second high voltage control unit in addition to the first high voltage control unit, the first microcontroller simultaneously connects to the first high voltage control unit and the second high voltage control unit. Similarly, if the second microcontroller directly controls the first high voltage control unit in addition to the second high voltage control unit, the second microcontroller simultaneously connects to the first high voltage control unit and the second high voltage control unit.

FIG. 6 only exemplifies a case that the first microcontroller directly controls the first high voltage control unit and the second high voltage control unit, and the second microcontroller also directly controls the first high voltage control unit and the second high voltage control unit. If the first microcontroller only directly controls the first high voltage control unit, and the second microcontroller only directly controls the second high voltage control unit, then the first microcontroller is only connected to the first high voltage control unit, and the second microcontroller is only connected to the second high voltage control unit.

It should be noted that, in the case that the first microcontroller and the second microcontroller control the first high voltage control unit and the second high voltage control unit jointly, the first switching unit or the second switching unit may be turned on only when the signal of the first microcontroller and the signal of the second microcontroller are simultaneously valid.

In addition, it should be noted that, in the above embodiments, the communication or connection manner between the components of the battery management system 10 and peripheral components may be performed by various approaches such as plug-in connection, solder connection, and wireless transmission, and the like.

A person skilled in the art will appreciate that the above embodiments are embodiments for performing the present disclosure, and in practice, various changes may be made formally and in detail without departing from the spirit and scope of the present disclosure.

What is claimed is:

1. A battery management system, comprising:
a battery monitoring module, a first microcontroller, a second microcontroller, and a sampling control module, the first microcontroller being connected to the second microcontroller;
wherein the battery monitoring module is configured to monitor a state of a battery pack, and transmit the state of the battery pack to the first microcontroller and the second microcontroller respectively via a state signal of the battery pack, and control the state of the battery pack according to a first control instructions from the first microcontroller and the second microcontroller;
wherein the sampling control module is configured to detect a state of a high voltage loop of the battery pack, and transmit the state of the high voltage loop of the battery pack to the first microcontroller and the second microcontroller respectively via a state signal of the high voltage loop of the battery pack, and control the state of the high voltage loop of the battery pack according to the a second control instruction from the first microcontroller and the second microcontroller;
when the first microcontroller and the second microcontroller are in normal operation, the first microcontroller and the second microcontroller individually acquire the state signal of the battery pack and the state signal of the high voltage loop of the battery pack, and each of the first microcontroller and the second microcontroller independently perform a control on the battery pack and the battery management system via the battery monitoring module according to the state signal of the battery pack and via the sampling control module according to the state signal of the high voltage loop of the battery pack, or, the first microcontroller independently performs the control on the battery pack and the battery management system via the battery monitoring module according to the state signal of the battery pack and via the sampling control module according to the state signal of the high voltage loop of the battery pack, and the second microcontroller is in a standby state.

2. The battery management system according to claim 1, wherein if each of the first microcontroller and the second microcontroller independently perform the control on the battery pack and the battery management system via the battery monitoring module according to the state signal of the battery pack and via the sampling control module according to the state signal of the high voltage loop of the battery pack, the effective microcontroller independently performs the control on the battery pack when either of the first microcontroller and the second microcontroller is out of operation.

3. The battery management system according to claim 1, wherein if the first microcontroller independently performs the control on the battery pack and the battery management system via the battery monitoring module according to the state signal of the battery pack and via the sampling control module according to the state signal of the high voltage loop of the battery pack, and the second microcontroller is in a standby state, the second microcontroller independently performs the control on the battery pack and the battery management system via the battery monitoring module according to the state signal of the battery pack and via the sampling control module according to the state signal of the high voltage loop of the battery pack when the second microcontroller detects that the first microcontroller is out of operation.

4. The battery management system according to any one of claim 1, wherein the sampling control module comprises a high voltage measurement unit, a first high voltage control unit and a second high voltage control unit;
the high voltage measurement unit is configured to obtain the state signal of the high voltage loop of the battery pack by sampling, and transmit the state signal of the high voltage loop of the battery pack to the first microcontroller and the second microcontroller;
the first high voltage control unit is configured to control a state of a first switching unit in the high voltage loop of the battery pack according to the second control instruction from the first microcontroller and/or the second microcontroller; and
the second high voltage control unit is configured to control a state of a second switching unit in the high voltage loop of the battery pack according to the second control instruction from the first microcontroller and/or the second microcontroller.

5. The battery management system according to claim 4, wherein the battery management system further comprises one or both of a first transmission module and a second transmission module;
wherein the battery monitoring module transmits the state signal of the battery pack to the first microcontroller and the second microcontroller via the first transmission module;
the second transmission module is configured to transmit the state signal of the high voltage loop of the battery pack sampled by the high voltage measurement unit to the first microcontroller and the second microcontroller; and/or the second transmission module is configured to transmit the second control instruction from the first microcontroller to the first high voltage control unit and the second high voltage control unit, and transmit the second control instruction from the second microcontroller to the first high voltage control unit and the second high voltage control unit.

6. The battery management system according to claim 5, wherein the high voltage measurement unit comprises a first high voltage measurement subunit and a second high voltage measurement subunit;
the first high voltage measurement subunit is configured to obtain the state signal of the high voltage loop of the battery pack by sampling, and transmit the state signal of the high voltage loop of the battery pack to the first microcontroller via the second transmission module; and
the second high voltage measurement subunit is configured to obtain the state signal of the high voltage loop of the battery pack by sampling, and transmit the state signal of the high voltage loop of the battery pack to the second microcontroller via the second transmission module.

7. The battery management system according to claim 6, wherein the second transmission module comprises a first separation unit and a second separation unit;
the first separation unit is configured to convert the state signal of the high voltage loop of the battery pack sampled by the first high voltage measurement subunit from a high voltage signal to a low voltage signal and transmit the converted state signal of the high voltage loop of the battery pack to the first microcontroller;
the second separation unit is configured to convert the state signal of the high voltage loop of the battery pack sampled by the second high voltage measurement subunit from a high voltage signal to a low voltage signal and transmit the converted state signal of the high voltage loop of the battery pack to the second microcontroller; and/or
the second transmission module further comprises a third separation unit and a fourth separation unit;
the third separation unit is configured to convert the second control instruction from the first microcontroller from a high voltage signal to a low voltage signal and transmit the converted second control instruction to the first high voltage control unit and the second high voltage control unit; and
the fourth separation unit is configured to convert the second control instruction from the second microcontroller from a high voltage signal to a low voltage signal and transmit the converted second control instruction to the first high voltage control unit and the second high voltage control unit.

8. The battery management system according to claim 5, wherein the battery monitoring module is located in a high voltage region, and the first microcontroller and the second microcontroller are located in a low voltage region;
the first transmission module is configured to convert the state signal of the battery pack monitored by the battery monitoring module from a high voltage signal to a low voltage signal and transmit the converted state signal of the battery pack to the first microcontroller and the second microcontroller.

9. The battery management system according to claim 5, wherein the high voltage measurement unit is located in a high voltage region, and the first microcontroller and the second microcontroller are located in a low voltage region;

the second transmission module is configured to convert the state signal of the high voltage loop of the battery pack sampled by the high voltage measurement unit from a high voltage signal to a low voltage signal and transmit a converted state signal of the high voltage loop of the battery pack to the first microcontroller and the second microcontroller.

10. A battery management system, comprising:
a battery monitoring module, a first microcontroller, a second microcontroller, and a sampling control module, the first microcontroller being connected to the second microcontroller;
wherein the battery monitoring module is configured to monitor a state of a battery pack, and transmit the state of the battery pack to the first microcontroller and/or the second microcontroller via a state signal of the battery pack, and control the state of the battery pack according to a first control instruction from the first microcontroller and the second microcontroller;
wherein the sampling control module is configured to detect a state of a high voltage loop of the battery pack, and transmit the state of the high voltage loop of the battery pack to the first microcontroller and the second microcontroller respectively via a state signal of the high voltage loop of the battery pack, and control the state of the high voltage loop of the battery pack according to a second control instruction from the first microcontroller and the second microcontroller;
when the first microcontroller and the second microcontroller are in normal operation, the first microcontroller and the second microcontroller individually acquire at least a part of the state signal of the battery pack and the state signal of the high voltage loop of the battery pack, and cooperate with each other according to individually acquired state signals, perform a control on the battery pack and the battery management system via the battery monitoring module and the sampling control module.

11. The battery management system according to claim 10, wherein the second microcontroller controls the battery pack and the battery management system to be in a safe mode via the battery monitoring module and the sampling control module when the first microcontroller is out of operation.

12. The battery management system according to claim 10, wherein the second microcontroller processes at least a part of the acquired state signal of the battery pack and the acquired state signal of the high voltage loop of the battery pack, and transmits a processing result to the first microcontroller;
the first microcontroller performs the control on the battery pack and the battery management system via the battery monitoring module and the sampling control module after the processing result of the second microcontroller is validated by the first microcontroller and passes the validation.

13. The battery management system according to any one of claim 10, wherein the sampling control module comprises a high voltage measurement unit, a first high voltage control unit and a second high voltage control unit;
the high voltage measurement unit is configured to obtain the state signal of the high voltage loop of the battery pack by sampling, and transmit the state signal of the high voltage loop of the battery pack to the first microcontroller and the second microcontroller;
the first high voltage control unit is configured to control a state of a first switching unit in the high voltage loop of the battery pack according to the second control instruction from the first microcontroller and/or the second microcontroller; and
the second high voltage control unit is configured to control a state of a second switching unit in the high voltage loop of the battery pack according to the second control instruction from the first microcontroller and/or the second microcontroller.

14. The battery management system according to claim 13, wherein the battery management system further comprises one or both of a first transmission module and a second transmission module;
wherein the battery monitoring module transmits a part of the state signal of the battery pack to the first microcontroller and transmits another part of the state signal of the battery pack to the second microcontroller via the first transmission module;
the second transmission module is configured to transmit a part of the state signal of the high voltage loop of the battery pack sampled by the high voltage measurement unit to the first microcontroller, and transmit another part of the state signal of the high voltage loop of the battery pack sampled by the high voltage measurement unit to the second microcontroller; and/or, to transmit the second control instruction from the first microcontroller to the first high voltage control unit and/or the second high voltage control unit, and transmit the second control instruction from the second microcontroller to the first high voltage control unit and/or the second high voltage control unit;
or, the second transmission module is configured to transmit the whole of the state signal of the high voltage loop of the battery pack sampled by the high voltage measurement unit to the first microcontroller and the second microcontroller respectively; and/or, to transmit the second control instruction from the first microcontroller to the first high voltage control unit and/or the second high voltage control unit, and transmit the second control instruction from the second microcontroller to the first high voltage control unit and/or the second high voltage control unit.

15. The battery management system according to claim 14, wherein the high voltage measurement unit comprises a first high voltage measurement subunit and a second high voltage measurement subunit;
the first high voltage measurement subunit is configured to obtain the state signal of the high voltage loop of the battery pack by sampling, and transmit the state signal of the high voltage loop of the battery pack to the first microcontroller via the second transmission module; and
the second high voltage measurement subunit is configured to obtain the state signal of the high voltage loop of the battery pack by sampling, and transmit the state signal of the high voltage loop of the battery pack to the second microcontroller via the second transmission module.

16. The battery management system according to claim 15, wherein the second transmission module comprises a first separation unit and a second separation unit;
the first separation unit is configured to convert the state signal of the high voltage loop of the battery pack sampled by the first high voltage measurement subunit from a high voltage signal to a low voltage signal and transmit the converted state signal of the high voltage loop of the battery pack to the first microcontroller;

the second separation unit is configured to convert the state signal of the high voltage loop of the battery pack sampled by the second high voltage measurement subunit from a high voltage signal to a low voltage signal and transmit the converted state signal of the high voltage loop of the battery pack to the second microcontroller; and/or the second transmission module further comprises a third separation unit and a fourth separation unit;

the third separation unit is configured to convert the second control instruction from the first microcontroller from a high voltage signal to a low voltage signal and transmit the converted second control instruction from the first microcontroller to the first high voltage control unit and/or the second high voltage control unit; and the fourth separation unit is configured to convert the second control instruction from the second microcontroller from a high voltage signal to a low voltage signal and transmit the converted second control instruction from the second microcontroller to the first high voltage control unit and/or the second high voltage control unit.

17. The battery management system according to claim 14, wherein the battery monitoring module is located in a high voltage region, and the first microcontroller and the second microcontroller are located in a low voltage region;

the first transmission module is configured to convert the state signal of the battery pack monitored by the battery monitoring module from a high voltage signal to a low voltage signal and transmit a part of the converted state signal of the battery pack to the first microcontroller and transmit another part of the converted state signal of the battery pack to the second microcontroller.

18. The battery management system according to claim 17, wherein the first transmission module comprises a separation unit and a communication unit;

the separation unit is configured to convert the state signal of the battery pack monitored by the battery monitoring module from a high voltage signal to a low voltage signal and transmit a communication signal in the converted state signal of the battery pack to the first microcontroller via the communication unit;

and the separation unit is configured to convert the first control instruction from the first microcontroller transmitted by the communication unit from a low voltage signal to a high voltage signal and transmit the converted first control instruction to the battery monitoring module;

and the separation unit is configured to convert a fault diagnostic signal in the state signal of the battery pack from a high voltage signal to a low voltage signal and transmit the converted fault diagnostic signal to the second microcontroller.

19. The battery management system according to claim 17, wherein the first transmission module comprises a separation unit, a communication unit, and a control unit;

the separation unit is configured to:

convert the state signal of the battery pack monitored by the battery monitoring module from a high voltage signal to a low voltage signal, and transmit the converted state signal of the battery pack to the first microcontroller via the communication unit and transmit the converted state signal of the battery pack to the control unit, or transmit a part of the converted state signal of the battery pack to the first microcontroller via the communication unit and transmit another part of the converted state signal of the battery pack to the control unit; and the control unit determines a diagnosis result of the state of the battery pack according to the acquired state signal of the battery pack, and transmits the diagnosis result to the second microcontroller.

20. The battery management system according to claim 14, wherein the high voltage measurement unit is located in a high voltage region, and the first microcontroller and the second microcontroller are located in a low voltage region;

the second transmission module is configured to convert the state signal of the high voltage loop of the battery pack sampled by the high voltage measurement unit from a high voltage signal to a low voltage signal and transmit a part of the converted state signal of the high voltage loop of the battery pack to the first microcontroller and transmit another part of the converted state signal of the high voltage loop of the battery pack to the second microcontroller;

or, the second transmission module is configured to convert the state signal of the high voltage loop of the battery pack sampled by the high voltage measurement unit from a high voltage signal to a low voltage signal and transmit the converted state signal of the high voltage loop of the battery pack to the first microcontroller and the second microcontroller respectively.

* * * * *